(12) United States Patent
Graham

(10) Patent No.: US 8,907,963 B2
(45) Date of Patent: Dec. 9, 2014

(54) CONCURRENT GRAPHIC CONTENT ON MULTIPLE DISPLAYS

(75) Inventor: Neil John Graham, Ottawa (CA)

(73) Assignee: 2236008 Ontario Inc., Waterloo, Ontario (CA)

( * ) Notice: Subject to any disclaimer, the term of this patent is extended or adjusted under 35 U.S.C. 154(b) by 545 days.

(21) Appl. No.: 13/295,410

(22) Filed: Nov. 14, 2011

(65) Prior Publication Data

US 2013/0120222 A1    May 16, 2013

(51) Int. Cl.
| | | |
|---|---|---|
| G09G 5/00 | (2006.01) |
| G06F 15/00 | (2006.01) |
| G06T 1/00 | (2006.01) |
| G06F 15/16 | (2006.01) |
| G06F 15/80 | (2006.01) |
| G06T 1/20 | (2006.01) |
| G09G 5/36 | (2006.01) |
| G06F 12/06 | (2006.01) |
| G09G 5/399 | (2006.01) |
| G06F 3/14 | (2006.01) |
| G09G 5/12 | (2006.01) |

(52) U.S. Cl.
CPC .............. *G09G 5/399* (2013.01); *G06F 3/1431* (2013.01); *G09G 5/001* (2013.01); *G09G 5/12* (2013.01)
USPC ............ 345/556; 345/1.1; 345/501; 345/502; 345/503; 345/504; 345/505; 345/506; 345/574

(58) Field of Classification Search
USPC ............................ 345/574, 1.1, 501–506, 556
See application file for complete search history.

(56) References Cited

U.S. PATENT DOCUMENTS

| 6,046,709 A * | 4/2000 | Shelton et al. ................. 345/1.1 |
| 6,433,787 B1 * | 8/2002 | Murphy ....................... 345/556 |

* cited by examiner

*Primary Examiner* — Ke Xiao
*Assistant Examiner* — Robert Craddock
(74) *Attorney, Agent, or Firm* — Gowling Lafleur Henderson LLP

(57) ABSTRACT

Concurrent display of graphic content on multiple displays is described. A frame of graphic content to be displayed on multiple displays can be written to a single memory location. Previously written graphic content can be read to multiple displays having misaligned synchronization signals and new graphic content can be written to a different memory location concurrently.

18 Claims, 9 Drawing Sheets

CONCURRENT GRAPHIC CONTENT ON MULTIPLE DISPLAYS

TECHNICAL FIELD

The current application relates to displaying content and in particular to displaying content on multiple displays concurrently.

BACKGROUND

Typical graphics sub-systems use a dual buffer arrangement for graphics buffers in which the roles of foreground and background buffers are switched between a pair of buffers for each frame of graphics. When one frame is being displayed from one of the buffers, the next frame of graphic content can be written to the other buffer so that it is ready to be displayed when required. The switching between which buffer is being displayed from and which is being written to occurs in response to a synchronization signal for the display.

Multiple displays can be used to display the same content. Typically one of the displays is designated as a primary display whose synchronization signal is used to control switching between the display buffer and the rendering buffer. However, when using multiple displays to display the same content, the synchronization signal for one of the displays may not be in synch with the synchronization signal of the primary display. As a result, when the synchronization signal of the primary display occurs, the display and render buffers are switched, however one of the other displays may not have completed reading the content from the buffer before new content is written to it. When new content is rendered to a buffer that is being displayed by one of the displays artifacts will appear as the content that is in the process of being displayed is written over by new content.

In order to avoid artifacts when displaying the same content to multiple displays concurrently, the synchronization signals of the displays can be synchronized with each other so that no displays are reading from the display buffer when it is switched to the background buffer. Synchronizing signals of multiple displays may be difficult or impossible, for example if the display generates its own synchronization signals or if the multiple displays do not have a common refresh rate at which all of the displays operate.

Another attempt to avoiding artifacts when displaying the same content to multiple displays concurrently is to include separate display and render buffers for each of the displays. That is, each display can be associated with its own display and render buffers. The synchronization signal of each display can then be used to switch the buffers of the display. Since each of the displays has its own associated display and render buffers, a second display will not be displaying from a buffer as it is being rendered to. However, having separate buffers associated with each display requires providing the same content to the multiple buffers either by rendering the content to each of the rendering buffers or by copying the content rendered to one of the rendering buffers to one or more of the other rendering buffers. The additional rendering or copying of the content to the multiple render buffers can increase required CPU usage and memory bandwidth of a system and as such possibly decrease the overall performance of the system.

It is desirable to display content to multiple displays concurrently, while overcoming one or more current disadvantages.

BRIEF DESCRIPTION OF THE DRAWINGS

Embodiments are described herein with references to the appended drawings, in which.

DETAILED DESCRIPTION

Figure 1:
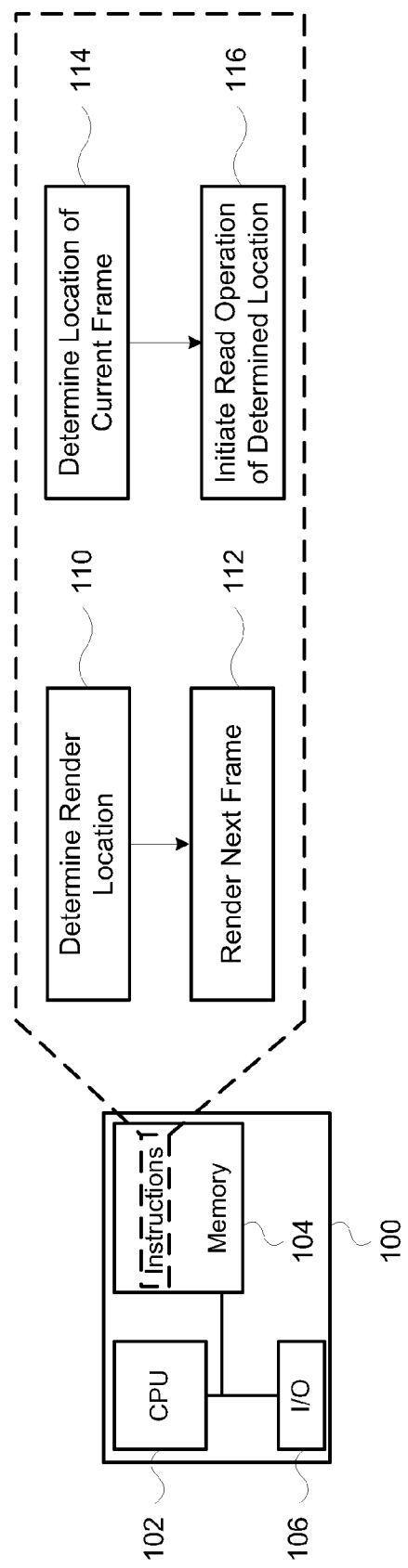
FIG. 1 depicts in a block diagram a device for displaying concurrent graphic content to multiple displays.

In accordance with the present disclosure there is provided a method for displaying graphic content to multiple displays concurrently comprising rendering frames of graphic content for concurrent display on the multiple displays by repeatedly determining, from a plurality of defined locations, a render location having no occurring read operation; and rendering a further frame of graphic content to the determined render location. The method further comprises displaying the graphic content on multiple displays concurrently by repeatedly receiving an indication of occurrence of a respective synchronization signal of any one of the multiple displays; responsive to the respective synchronization signal, determining a display location of a current frame of graphic content from the plurality of defined locations; and initiating a read operation from the display location for the display associated with the respective synchronization signal.

In accordance with the present disclosure there is further provided a method for displaying graphic content to multiple displays concurrently comprising determining a render location having no occurring read operation from a plurality of defined locations to render graphic content to; rendering a frame of graphic content to the determined render location; and for each one of the multiple displays, responsive to a respective synchronization signal initiating a read operation of graphic content from a previously rendered-to location, from the plurality of defined locations, for display on the respective display.

In accordance with the present disclosure there is further provided a device for displaying graphic content to multiple displays concurrently, the device comprising: a plurality of defined memory locations; a processing unit for configuring the device to provide determination of a render location having no occurring read operation from the plurality of defined memory locations to render graphic content to; rendering of a frame of graphic content to the determined render location; and for each one of the multiple displays, initiation of a read operation of graphic content from a previously rendered-to location, of the plurality of defined memory locations, for display responsive to a respective synchronization signal. The device further comprises at least one interface for communicating with the multiple displays.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Displaying content to multiple displays concurrently is further described herein. Each of the multiple displays has an associated synchronization signal. The synchronization signals may be for example a vertical synchronization signal (V-Sync) and may be provided by the display itself or may be provided by the device providing the content to display. The synchronization signals of the displays do not need to be synchronized with each other. When a display's synchronization signal occurs it begins displaying content from a current display buffer. A next frame of content is rendered to a buffer that is not being read from by any of the displays. As such, the rendering of content will not cause artifacts on the displays. The rendering of a next frame of content can be synchronized with one of the display's synchronization signals, although it is contemplated that new content could be written whenever a buffer is available to be written to, that is it is not being read for display by one of the displays.

FIG. 1 depicts in a block diagram a device for displaying concurrent graphic content to multiple displays. The device 100 comprises a central processing unit (CPU) 102 for executing instructions and a memory 104 for storing instructions. The device 100 may also comprise one or more input/output controllers 106 for connecting input and/or output devices to the device 100. The device 100 may have a plurality of displays (not shown) connected to it. As described further herein, the device 100 may display content concurrently on two or more connected displays. As will be appreciated devices may include separate rendering pipelines for rendering content for display. For example, a device 100 may include a rendering pipeline for rendering video to the displays, as well as a separate graphics pipeline for rendering computer generated content to the displays. The following description describes the content as being graphic content that is rendered by the graphics pipeline as opposed to the video pipeline. It should be appreciated that the graphic content rendered by the graphics pipeline can include video content.

The instructions stored in memory 104, when executed by the CPU 102 operate the device 100 to provide the functionality to display content concurrently on multiple displays. The functionality provided by the executed instructions comprises determining a render location (110) to render a next frame of the graphic content to. The render location is determined from a plurality of possible locations that are used to render the content to and display the content from. Each of the locations may be provided by an addressable location in memory or a range of addressable locations in memory. The memory could be provided in various locations, such as static random access memory (SRAM) located on a processing chip of the device, device random access memory (RAM) or an external memory device. As described further herein, determining the render location can be accomplished in various ways, however, regardless of how the render location is determined it will be one of the plurality of locations that is not being simultaneously read from. That is, the render location comprises one of the plurality of possible locations having no pending read operation. The rendering of the content may be synchronized with the synchronization signal of one of the multiple displays. For example, one of the multiple displays may be a primary display, whose synchronization signal is used to synchronize rendering of frames. It is contemplated that the rendering of the content does not need to be synchronized to one of the display's synchronization signals, but rather may occur once there is a location that can be rendered to. Once the render location has been determined, the next frame of content is rendered (112) to the render location. The next frame of content only needs to be rendered to the one render location. The next frame of content rendered to the render location can be provided to multiple displays as their respective synchronization signals occur. Since the render location used to render the content to is determined as not currently being read from, any content that is being written over is not also being read for display and as such no artifacts will occur due to possibly overwriting content as it is being displayed.

As new content is being rendered, previously rendered content is also being displayed concurrently on multiple displays. Each of the displays may be associated with a respective synchronization signal that indicates when to begin displaying the next frame of content. Responsive to the occurrence of respective synchronization signals of each of the multiple displays, a location of a current frame of content to display is determined (114). The location is determined from the plurality of possible locations. The location of the current frame to display may be determined in various ways, including for example using a display pointer that points to the location with the current frame of content to display. The display pointer may be updated to the location of the subsequent frame of content to display based on the synchronization signal of one of the displays such as the primary display. Once the location of the current frame is determined, a read operation of the determined location is initiated (116) to read the content from the determined location for display by the display associated with the respective synchronization signal.

In order to ensure that there is a location that is available to be written to, that is one that is not currently being read from, at least one more location than the number of displays is provided. For example, if the graphic content is being displayed to two displays concurrently, three or more locations should be used in order to ensure that at least one location is not being read from when the next frame of graphic content is to be rendered. The location to render the next frame of content to can be determined in various ways. For example as described further herein, the location may be tracked using a display-hold pointer which points to a location that may be being read for display by one of the connected monitors. Additionally or alternatively, locations may be checked to determine if they are being read from using a flag or other similar mechanism such as a counting semaphore, and if they are not being read from they may be used to render the next frame of content.

Rendering the graphic content comprises writing data to memory and displaying the graphic content comprises reading data from memory. The reading from and writing to memory may be accomplished using various memory access techniques, including Direct Memory Access (DMA).

Figure 2:
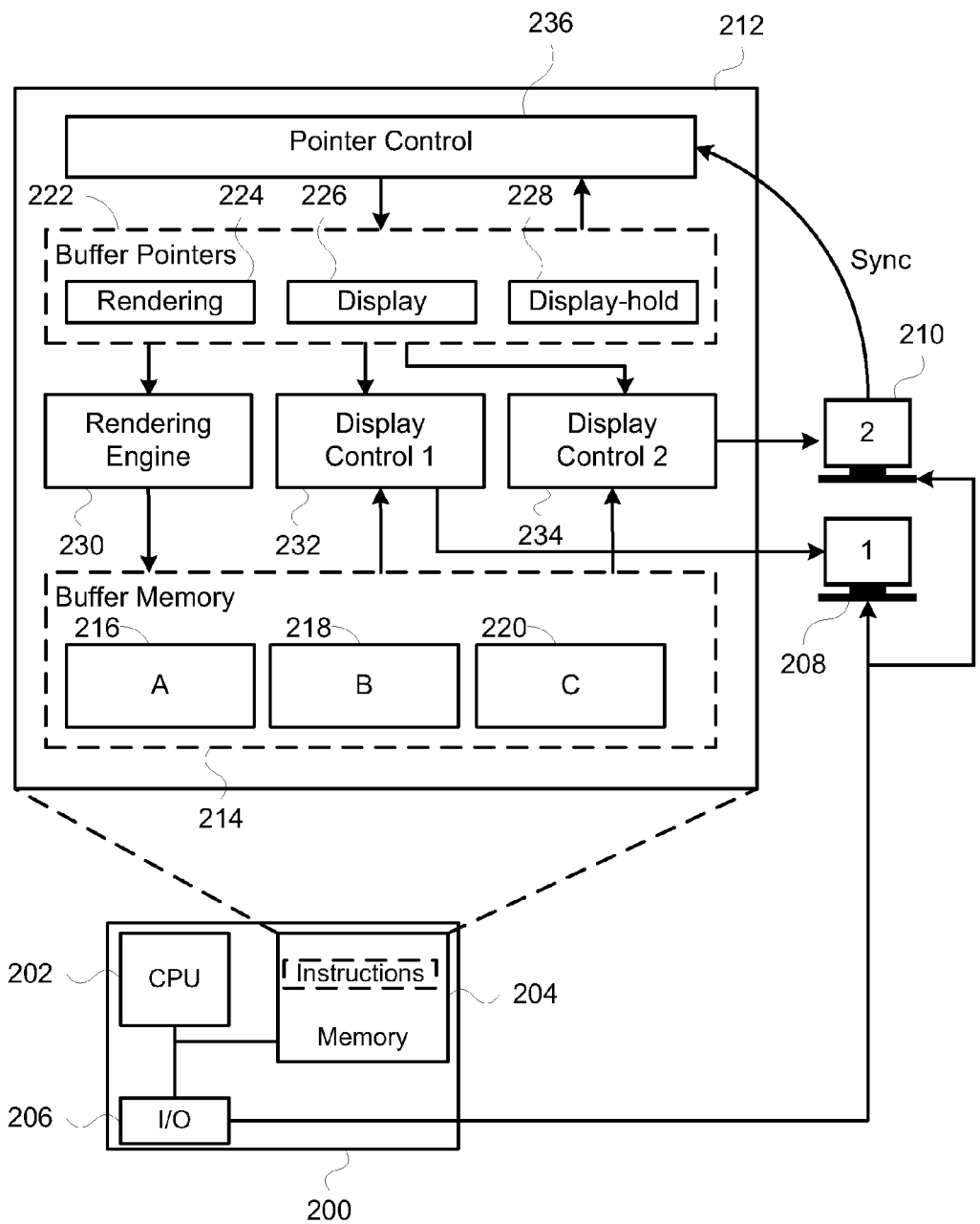
FIG. 2 depicts in a block diagram a device for displaying concurrent graphic content to multiple displays.

FIG. 2 depicts in a block diagram a device for displaying concurrent graphic content to multiple displays. The device 200 is considered embodied herein as a device such as a portable electronic device including a smart-phone or tablet device having a touch screen. It is also contemplated that the device may be other types of electronic devices or incorporated therein including, for example, laptop computers, personal computers, set-top boxes, personal entertainment devices, navigation devices, vehicle control systems, network devices or other electronic devices that may benefit from displaying concurrent graphic content to multiple displays.

Alternatively the device 200 may be a processing device such as a graphics processor, a system-on-chip comprising a central processing unit (CPU) and a graphics processing unit (GPU) or a general-purpose processor capable of displaying graphics.

The device 200 comprises various cooperating hardware components that interact during the operation of the device. A central processing unit (CPU) 202 executes instructions stored in memory 204 to control the overall operation of the device 200. The CPU 202 may be connected directly or indirectly to a plurality of hardware components, including a storage unit 204 or computer readable memory and an input/output (I/O) controller 206. The device 200 may be connected to one or more displays. Two displays 208, 210 are represented for illustrative purposes. The two displays 208, 210 are both depicted as being external to the device 200 and connected to the CPU 202 through the I/O controller 206. It is contemplated that other arrangements are also possible. For example, one display could be part of the device 200, and/or the displays could be connected to the CPU 202 via different components such as a graphics processing unit (GPU).

The hardware components and connections depicted in FIG. 2 are illustrative and not all required components are depicted. For example, a battery is not shown, however one or more would be required for a portable device. Similarly, not all components depicted may be required based upon the particular electronic device.

The instructions stored in memory 204 may be executed by the CPU 202. When the instructions are executed by the CPU 202 the device 200 is operable to provide a concurrent display system 212. As described further herein, the concurrent display system 212 allows graphics content to be written once to memory and displayed to multiple displays concurrently while mitigating the appearance of some visual artifacts.

The concurrent display system 212 comprises a plurality of locations 216, 218, 220 in a buffer memory 214. Each location may be pointed to by one or more buffer pointers 222. As depicted in FIG. 2, there are three buffer pointers, namely a rendering pointer 224, a display pointer 226 and a display-hold pointer 228. As depicted, the number of buffer pointers corresponds to the number of memory locations, however, as described further herein, the display-hold pointer 228 may comprise a plurality of pointers chained together to allow the concurrent display system to function under a wide variety of conditions.

The rendering pointer 224 and the display pointer 226 are used by a rendering engine 230 and display controls 232, 234 to respectively specify one of the buffer memory locations 216, 218, 220 to write to or read from. The rendering engine 230 writes the graphic content to the memory location indicated by the rendering pointer 224. A display control 232, 234 is associated with each display 208, 210 and reads the graphic content from the memory location pointed to by the display pointer 226.

The rendering engine 230 and the display controls 232, 234 each read the respective pointer at the beginning of an operation and write to or read from the specified memory location until the write or read operation is completed. In order to prevent artifacts from being rendered onto one of the displays as a result of the rendering engine 230 writing to a buffer memory location that is being read by one of the display controls 232, 234, a pointer control component 236 is provided.

The pointer control component 236 monitors a synchronization signal of one of the displays 208, 210 and changes the buffer pointer 222 assignments. It is noted that display 210 is depicted as providing the synchronization signal; however, a component of the device 200 may alternatively generate the synchronization signal for a respective display at a rate that the display may utilize. For example, each of the display controls 232, 234 may generate a synchronization signal at a respective rate that the associated display 208, 210 can function properly with. The synchronization signal may be any signal that indicates, or is synchronized with, the beginning, or end, of a frame to be displayed. For example the synchronization signal may be a vertical synchronization signal commonly referred to as a V-Sync signal. Additionally or alternatively, if the number of horizontal lines in a frame is known a priori, a horizontal synchronization signal can be used as the synchronization signal.

The pointer control component 236 receives an indication that the synchronization signal of one of the displays 208, 210 has occurred. The specific display that provides the pointer control component 236 with the synchronization signal may be either of the displays; however, it may be selected to be associated with a primary display. Which display is considered the primary display may be determined in various ways. For example, a user of the electronic device or a display driver may specify which display is the primary display. Alternatively, the primary display may be selected as the display that has the highest display resolution, or the highest refresh rate, or a combination thereof.

When the pointer control component 236 receives the indication that the synchronization has occurred, the buffer pointers are changed. In particular the pointer control component 236 changes the memory location pointed to by the display pointer 226 to the memory location previously pointed to by the rendering pointer 234. That is, the memory location that will be read by the display controls 232, 234, on their next synchronization signals, is updated to be the memory location that was just written to by the rendering engine 230. The pointer control component 236 uses the display-hold pointer 228 in order to avoid the rendering engine 230 from writing to a memory location that may still be being read by a display control 232, 234. The pointer control component 236 changes the display-hold pointer 228 to point to the memory location previously pointed to by the display pointer 226. The display-hold pointer 228 provides a way of ensuring that previous graphic content that may still be in the process of being read, is not written to. The rendering pointer 224 is updated to point to a memory location previously pointed to by the display-hold pointer 228.

The pointer control component 236 allows the memory location used for reading graphic content from to be held for a period to ensure that any of the displays 208, 210 that began reading from the memory location have completed reading from the memory location before allowing the rendering engine 230 to write to the memory location. As such, multiple displays 208, 210 can display the same graphic content concurrently without requiring writing the same graphic content to different memory locations concurrently.

Figure 3:
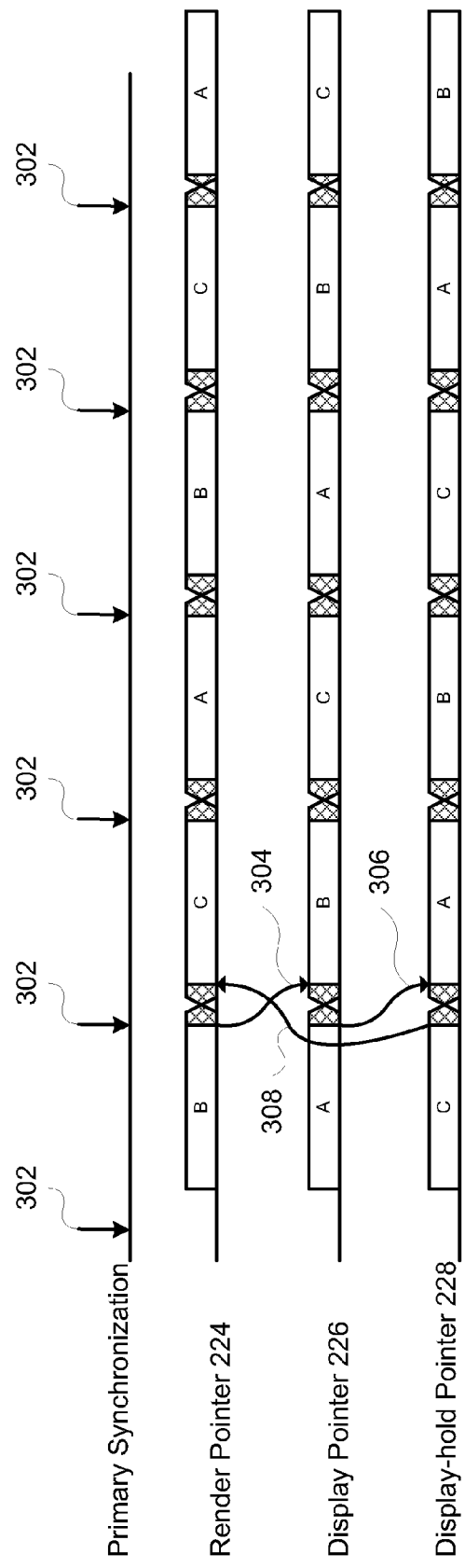
FIG. 3 depicts in a time-line memory location assignments of pointers.

FIG. 3 depicts in a time-line memory locations pointed to by buffer pointers. The buffer pointers 222 are updated when the synchronization signal 302 of the primary display occurs. As depicted in FIG. 3, when the synchronization signal 302 occurs, the display pointer 226 is updated to the memory location previously pointed to by the rendering pointer 224 (depicted by arrow 304); the display-hold pointer 228 is updated to the memory location previously pointed to by the display pointer 226 (depicted by arrow 306); and the rendering pointer 224 is updated to the memory location previously pointed to by the display-hold pointer 228 (depicted by arrow 308).

The synchronization signal of a display occurs at a display frequency of the display. The display period, that is the period between two synchronization signals, may comprise a display interval during which content to be displayed is read and a blanking interval during which the reading of the display content is completed but the display period has not completed.

Figure 4:
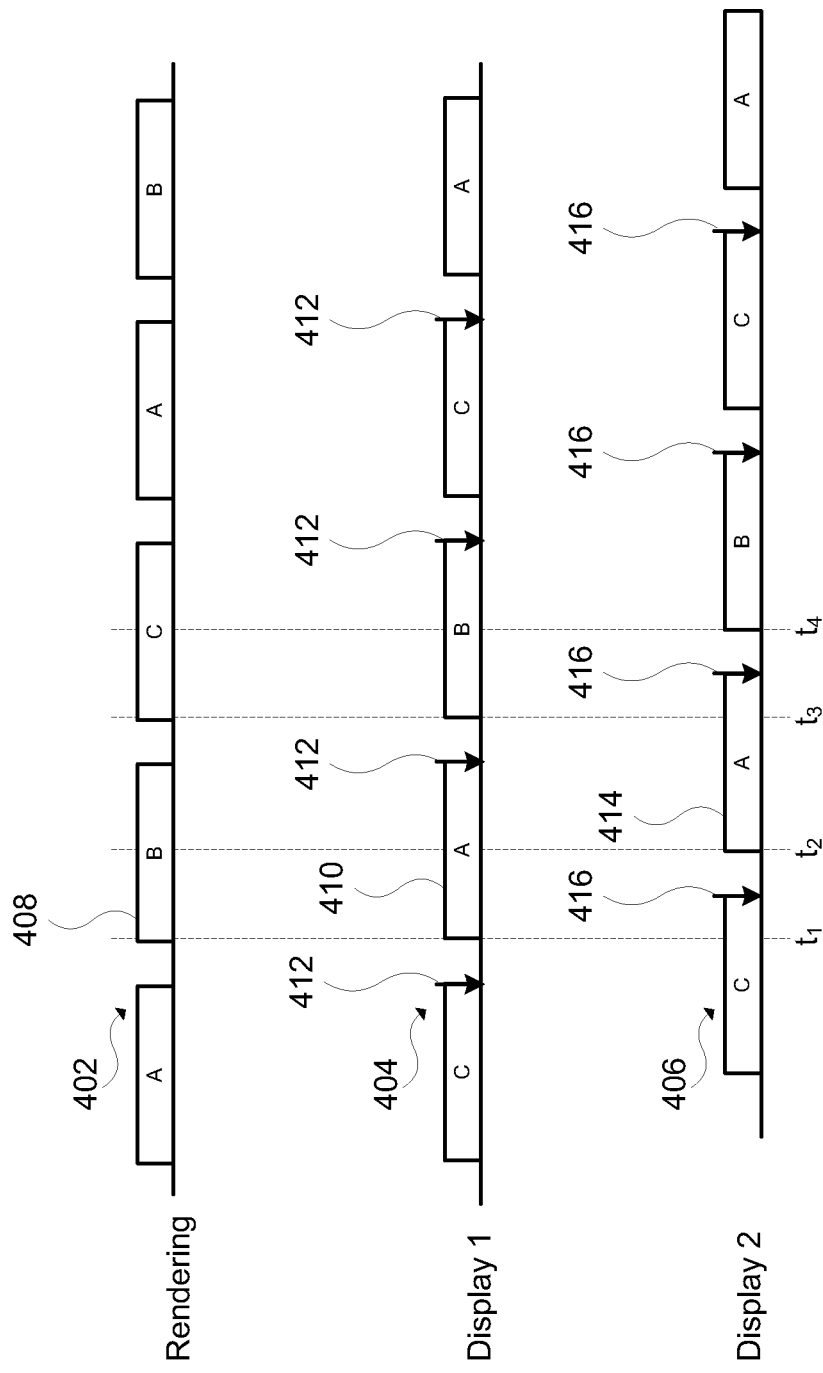
FIG. 4 depicts in a time-line memory locations read by displays and written to by a rendering engine.

FIG. 4 depicts in a time-line memory locations read by displays and written to by a rendering engine. FIG. 4 depicts three time-lines 402, 404 406. The first time-line 402 depicts the memory locations 408 written to during a time period by the rendering engine 230. The second time-line 404 depicts the memory locations 410 read from by the first display control 232 as well as the synchronization signal 412 associated with the first display. The third time-line 406 depicts the memory locations 414 read from by the second display control 234 as well as the synchronization signal 416 associated with the second display.

In FIG. 4, the primary display is considered to be the display associated with the first display control 232. As such, when the synchronization signal 412 occurs, the memory locations pointed to by buffer pointers 222 are updated as described above with reference to FIG. 3. As depicted there may be a period of time following the occurrence of the synchronization signal during which the memory locations are not written to or read from. This period of time is commonly referred to as a blanking interval. The pointers may be updated during this interval. Although the blanking interval is depicted as occurring immediately after the synchronization signal, it may alternatively occur immediately before the synchronization signal, or some time before or after the synchronization signal.

The rendering engine 230 is synchronized to the primary display so that it begins rendering the next frame once the primary synchronization signal occurs. Following the occurrence of the primary synchronization signal, the rendering engine 230 determines the memory location to write the rendered graphics to by reading the rendering pointer 224, which has been updated. The rendering engine 230 can then start writing the rendered graphic content for the subsequent frame to the determined memory location. Similarly, the display control 232 associated with the primary display determines the memory location to read the graphic content to be displayed from by reading the display pointer 226, which has been updated. The display control 232 of the primary display can then start reading from the memory location to display the graphic content previously written to the memory location by the rendering engine 230.

As depicted in FIG. 4, the synchronization signals 412, 416 of the two displays may not be synchronized. The second display control 234 determines the memory location to read the graphic content to be displayed from by reading the display pointer 226 in response to its associated synchronization signal 416. When the synchronization signal 416 associated with the second display occurs, the display pointer 226 still points to the memory location being read by the primary display control 232. The second display control begins a read operation from the memory location pointed to by the display pointer 226 and continues reading from the memory location until the frame of graphic content has been completely read. The second display control 234 may still be reading from the memory location when the next synchronization signal 412 of the primary display occurs. The synchronization signal 412 of the primary display is used to synchronize the rendering of the graphic content so that when the synchronization signal 412 of the primary display occurs, the next frame of graphic content begins being rendered to a new memory location. In order to avoid rendering to a memory location that is currently being read from, which could result in artifacts being displayed, the pointer control component 236 sets the memory location for the rendering pointer 224 from the display-hold pointer 228. The display-hold pointer 228 may be used to ensure that enough time has passed from the beginning of displaying the graphic content on the primary display so that the slowest display will have completed reading from the memory location. The display-hold pointer's 228 memory location is updated to the location previously pointed to by the display pointer 226

FIGS. 5 to 8 depict the pointer assignments of the concurrent display system 212 and the memory 214 accessed by the rendering engine 230 and the display controls 232, 234. The operation of the concurrent display system 212 is described further with reference to FIGS. 5 to 8. It is assumed for illustrative purposes that the first display 208 is the primary display and the synchronization signals of the two displays 208, 210 occur at different times.

Figure 5:
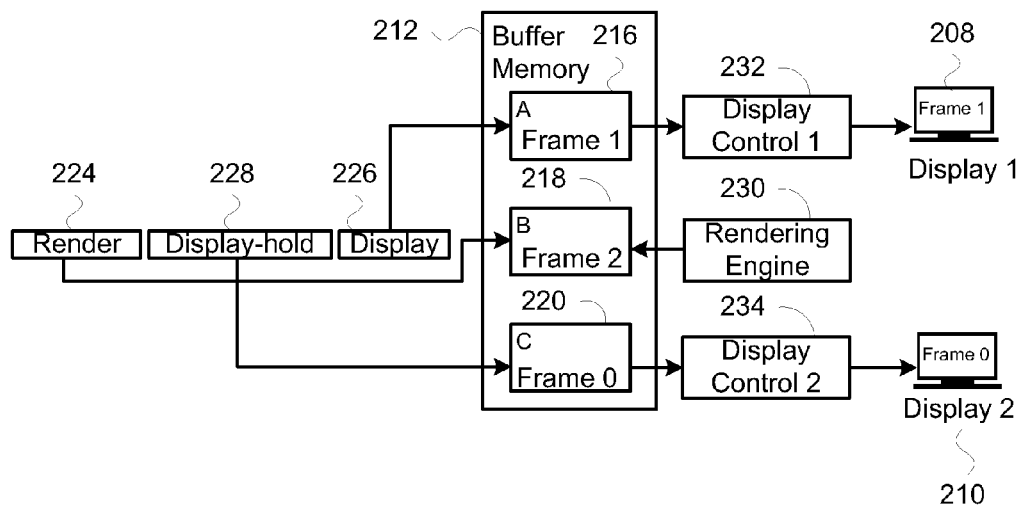
FIGS. 5 to 8 depict in block diagrams illustrative pointer assignments and memory locations accessed by components of the concurrent display system of FIG. 2.

Referring to FIG. 5, the assignments of the buffer pointers 222 (224, 226, 228) are depicted following occurrence of the primary synchronization signal 412, corresponding to time $t_1$ of FIG. 4. As depicted, the display pointer 226 points to the memory location 'A' 216, the display-hold pointer 228 points to the memory location 'C' 220, and the rendering pointer 224 points to memory location 'B' 218.

The rendering engine 230 determines the memory location to write to. The rendering engine 230 determines the memory location by reading the rendering pointer 224, which as depicted points to memory location 'B'. Once the memory location 'B' is determined, the rendering engine 230 begins writing the graphic content 'Frame 2' to the location.

The primary display control 232 determines the memory location to read from. The primary display control 232 determines the memory location by reading the display pointer 226, which as depicted points to memory location 'A'. Once the memory location 'A' is determined, the primary display control 232 begins reading the graphic content 'Frame 1' for display.

The memory location 'C' pointed to by the display-hold pointer 228 has the previous graphic content 'Frame 0'. Since the synchronization signal 416 of the second display 210 occurs after the primary synchronization signal 412, the second display control 234 is still reading the memory location 'C' and displaying 'Frame 0' to the display 210.

Figure 6:
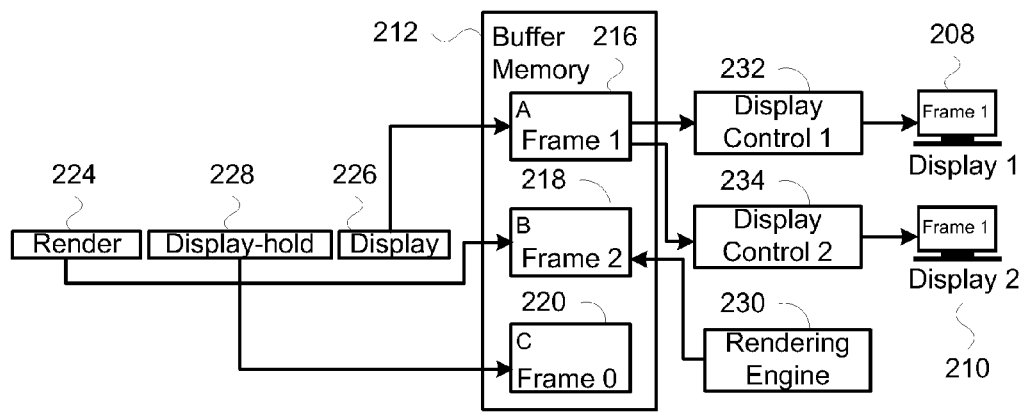

FIG. 6, corresponding to time $t_2$ of FIG. 4, depicts the various components of the concurrent display system 212 after the synchronization signal 416 of the second display 210 has occurred. Following the synchronization signal 416 of the second display 210, the second display control 234 determines the memory location to read the graphic content from by reading the display pointer 226. The display pointer 226 still points to memory location 'A'. The second display control 234 begins reading the memory location 'A' for displaying the current graphic content 'Frame 1'. Since the buffer pointers 222 are only updated on the primary synchronization signal 412, no changes to the buffer pointers 222 occur, and the primary display control 232 and the rendering engine 230 continue accessing the same memory locations, 'A' and 'B' respectively, as depicted in FIG. 5. As depicted, both displays 208, 210 are presenting the same graphic content 'Frame 1' previously written to the single memory location 'A'.

Figure 7:
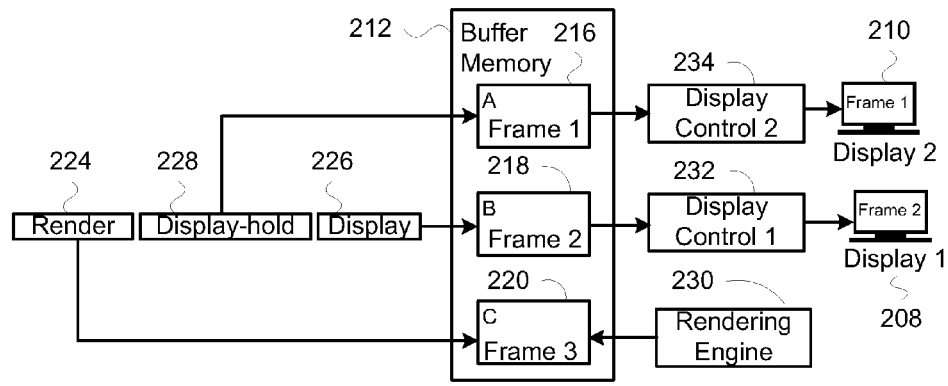

FIG. 7, corresponding to time $t_3$ of FIG. 4, depicts the various components of the concurrent display system 212 after the next primary synchronization signal 412 of the first display 208 has occurred. Following the primary synchronization signal 412, the buffer pointers 222 are updated as described above. As depicted, the memory location 'B' 218 previously pointed to by the rendering pointer 224 is now pointed to by the display pointer 226. The memory location 'B' 218 comprises the frame of graphic content 'Frame 2' that was just written to the memory by the rendering engine 230. The rendering pointer 224 is updated to point to the memory location 'C' 220 previously pointed to by the display-hold pointer 228. The memory location 'A' 216 previously pointed to by the display pointer 226 is now pointed to by the display-hold pointer 228. Since the two displays 208, 210 are not synchronized, the second display 210 may not have finished reading the previous graphic content 'Frame 1' from memory location 'A' 216. Since the rendering pointer 224 is updated to the previous display-hold pointer's memory location 'C' 220, as opposed to the previous display pointer's memory location 'A' 216, the second display control 234 can continue displaying the graphic content 'Frame 1' of memory location 'A' 216 without artifacts occurring due to the rendering engine 230 writing to the memory location being read by the second display control 234. The display control 232 of the first display reads the updated display pointer 226 to determine the memory location to read from, which is memory location 'B' 218. The display control 232 of the first display reads the graphics content 'Frame 2' from the memory location 'B' 218 for display. In synchronization with the primary display 208, the rendering engine 230 reads the rendering pointer 224 to determine the memory location to write the next graphic content 'Frame 3' to.

Figure 8:
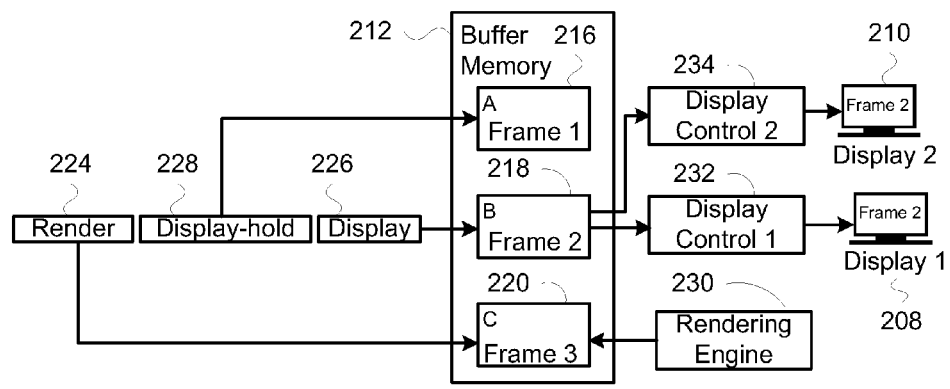

FIG. 8, corresponding to time $t_4$ of FIG. 4, depicts the various components of the concurrent display system 212 after the next synchronization signal 416 of the second display 210 has occurred. Following the synchronization signal 416 of the second display 210, the second display control 234 determines the memory location 'B' 218 to read the graphic content 'Frame 2' from by reading the display pointer 226. The display pointer 226 still points to memory location 'B' 218 as in FIG. 7. The second display control 234 begins reading the memory location 'B' 218 for displaying the current graphic content 'Frame 2'. Since the buffer pointers 222 are only updated on the primary synchronization signal 412, no changes to the buffer pointers 222 occur, and the primary display control 232 and the rendering engine 230 continue accessing the same memory locations as depicted in FIG. 7. As depicted, both displays are presenting the same graphic content 'Frame 2' read from the single memory location 'B' 218, while the rendering engine 230 writes the next graphic content 'Frame 3' to memory location 'C' 220.

Figure 9:
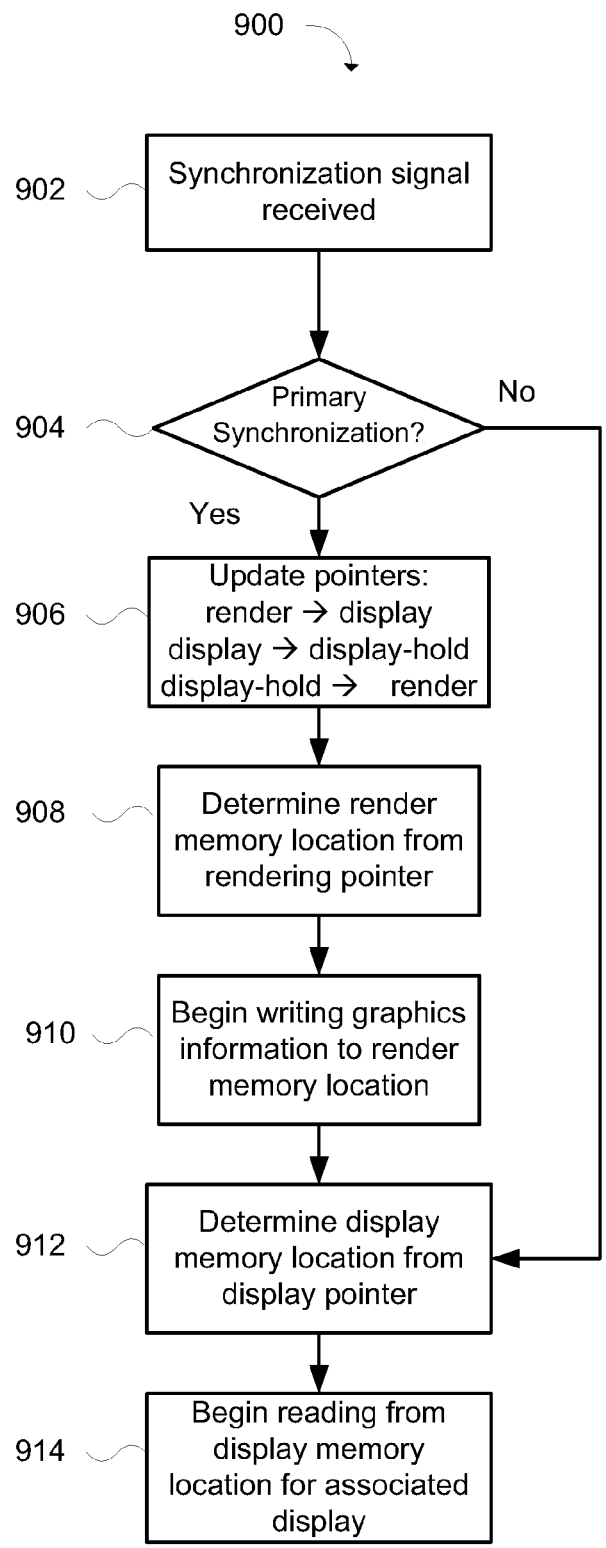
FIG. 9 depicts in a flow chart a method of displaying concurrent graphic content to multiple displays.

FIG. 9 depicts in a flow chart a method of concurrently displaying graphic content on multiple displays. The method 900 begins when a synchronization signal associated with one of the displays is received or occurs (902). It is determined whether the synchronization signal is associated with the primary display or not (904). When the synchronization signal is associated with the primary display (Yes at 904), buffer pointers are updated (906). In particular the updated values for the render, display and display-hold pointers are updated to the previous values for the display-hold, render and display pointers respectively. That is, the render pointer is updated from the display-hold pointer, the display pointer is updated from the render pointer and the display-hold pointer is updated from the display pointer. Once the pointers are updated, the next graphic content is rendered to the appropriate memory location. The memory location to write the graphic content to is determined from the rendering pointer (908), and then the graphic content is written to the memory location (910).

Once the buffer pointers have been updated, the graphic content is read for display to the display associated with the synchronization signal. In order to read the graphic content, the display memory location is determined by reading the display pointer (912). The graphic content of the memory location is read for display to the display associated with the synchronization signal (914). Reading of graphic content for display (914) may occur concurrently (e.g. overlapping in time) with the writing of the next graphic content (910).

If the synchronization signal is not associated with the primary display (No at 904), the buffer pointers are not updated and writing of new graphic content does not need to be started, as such the memory location of the graphic content for display is determined from the display pointer (912). Once the memory location of the graphic content for display is determined, reading of the memory location for display to the display associated with the synchronization signal is initiated (914).

The above has described systems and methods for displaying graphic content on multiple displays, illustrated using two displays, concurrently. According to the above systems and methods graphic content can be written to one memory location and displayed by multiple displays that have either misaligned (e.g. asynchronous, out-of-phase or drifting) synchronization signals, differing refresh rates or a combination of the two. A display-hold pointer that points to a single location has been described above. Such an implementation is well suited for use when the synchronization signals between a primary display and a slowest display are not misaligned by a significant amount. The synchronization signals of the displays should be aligned such that the slowest display will complete reading from the previous display location before the next synchronization signal of the primary display.

There is a limit to the difference between the refresh rates of the two monitors that one display hold pointer can provide artifact free concurrent display for. For example, when the refresh rate of the primary display is 120 Hz, a single display-hold pointer would not be sufficient to concurrently display the graphic content on a display having a refresh rate of 30 Hz due to the large possible misalignment of the two synchronization signals. In order to provide artifact free concurrent display for displays having a large difference between refresh rates while using a display-hold pointer, a further approach may utilize a plurality of chained pointers as the display-hold pointer as described further with reference to FIG. 10. Furthermore, the systems and method can be extended to three or more displays. The similar considerations for two displays apply for three or more displays. The number of chained pointers used for the display-hold pointer can be determined from a worst-case difference between refresh rates, and refresh phase alignment, of the secondary displays and the primary display. A corresponding increase in the number of memory locations would be required with chained pointers.

Figure 10:
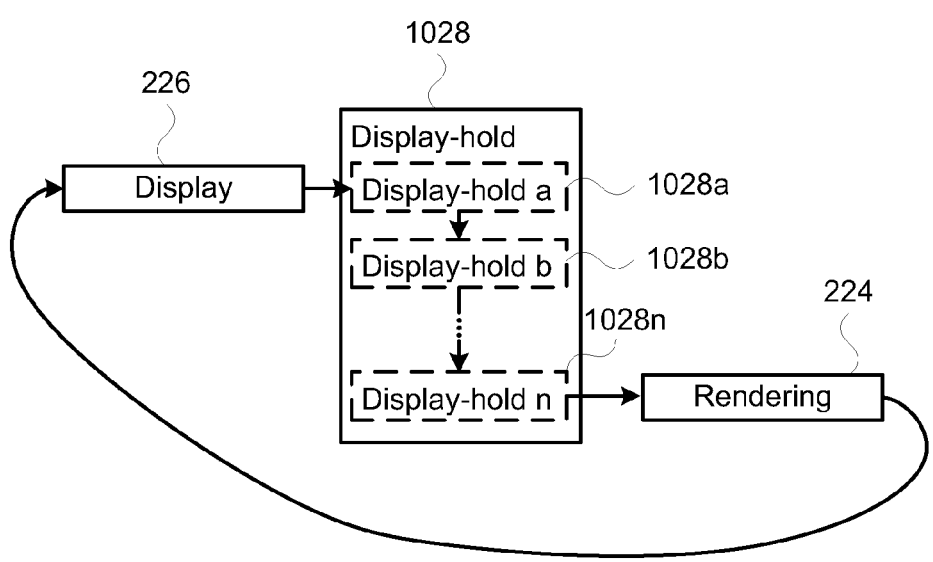
FIG. 10 depicts in a block diagram an illustrative display-hold pointer.

FIG. 10 depicts in a block diagram an illustrative display-hold pointer. The display-hold pointer 1028 may be used as the display-hold pointer 228 described above. The display-hold pointer 1028 comprises a plurality of chained together pointers 1028a, 1028b, and 1028n. The particular number of pointers to be chained together can be determined from the refresh rates and worst-case scenario for the phase alignment of the refresh cycles. The particular number of pointers ensures that once a secondary display begins reading from a memory location, the rendering engine will not write to the memory location until the secondary display has completed reading the memory location. An estimate for the number can be given by:

$$n = \text{floor}\left[\frac{P}{S}\right]$$

Where:
n is the number of chained pointers in the display-hold pointer;
P is the refresh rate of the primary display, which is assumed to have the fastest refresh rate;
S is the slowest refresh rate of the secondary displays; and
floor[x] rounds x down to the nearest integer, if x is not an integer.

As depicted in FIG. 10, the display-hold pointer may be provided by a first-in-first-out structure of a plurality of pointers. When the display-hold pointer 1028 is updated with the memory location from the display pointer 226, the updated memory location is added to the input of the FIFO structure, or the first pointer in the chain, and the memory locations are propagated down the FIFO structure. That is, the memory location of the top pointer 1028*a* is used to update the next pointer 1028*b*, and so on down the FIFO structure until the last pointer 1028*n* of the FIFO structure is updated with the memory location from the previous pointer in the FIFO structure. The memory location that is output from the FIFO structure, that is the last pointer 1028*n* of the chain, is used to update the rendering pointer 224.

Figure 11:
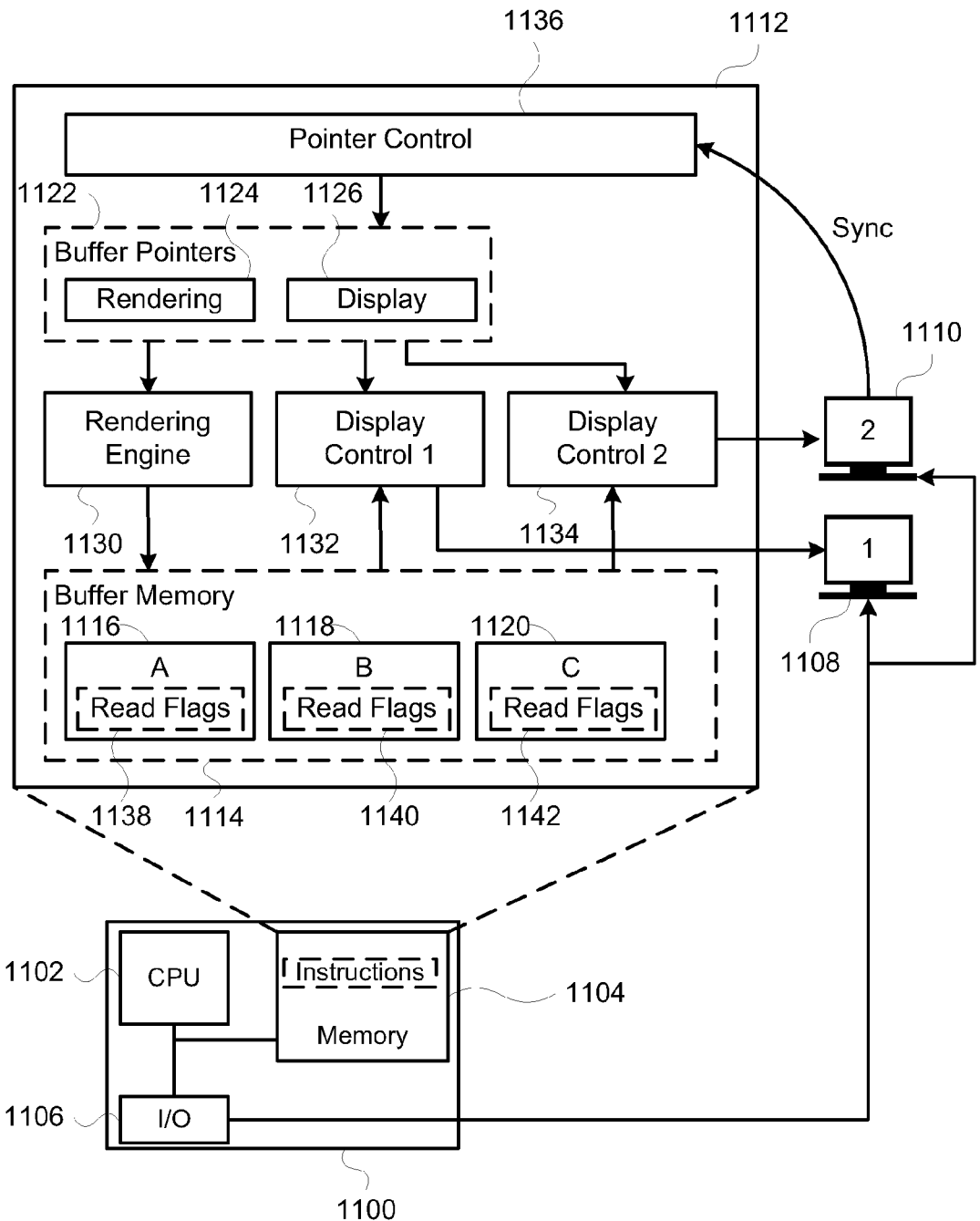
FIG. 11 depicts in a block diagram a further device for displaying concurrent graphic content to multiple displays.

FIG. 11 depicts in a block diagram a further device for displaying concurrent graphic content to multiple displays. As described further below, the device 1100 determines the location to render a next frame to by determining a location from a plurality of locations that are not being read from. Such an implementation may be well suited for use with displays that have a large misalignment between their synchronization signals. In contrast to the use of a chained display-hold pointer as described above, which requires an increase in the number of locations when there is a large misalignment of synchronization signals, the method provided by the device 1100 only requires at most one more location than the number of displays regardless of the misalignment between the synchronization signals. The device 1100 comprises various cooperating hardware components that can interact during the operation of the device. A central processing unit (CPU) 1102 executes instructions stored in memory 1104 to control the overall operation of the device 1100. The CPU 1102 may be connected directly or indirectly to a plurality of hardware components, including a storage unit 1104 or computer readable memory and an input/output (I/O) controller 1106. The device 1100 may be connected to one or more displays. The two displays 1108, 1110 are both depicted as being external to the device 1100 and connected to the CPU 1102 through the I/O controller 1106. It is contemplated that other arrangements are also possible. For example, one display could be part of the device 1100, and/or the displays could be connected to the CPU 1102 via different components such as a graphics processing unit (GPU).

The instructions when executed by the CPU 1102 operate the device 1100 to provide a concurrent display system 1112. The concurrent display system 1112 includes a buffer memory 1114 that provides a plurality of memory locations 1116, 1118, 1120 to which graphic content can be written to and read from. As depicted, there are two displays 1108, 1110. As such, if there are three memory locations in the buffer memory 1114, there will be at least one memory location not being read from for display on one of the displays. The concurrent display system 1112 includes buffer pointers 1122, including a rendering pointer 1124 and a display pointer 1126. The rendering pointer 1124 is used by a rendering engine 1130 to determine the memory location to write the next frame to. The display pointer 1126 is used by display controls 1132, 1134 to determine the memory location to read, and display, the current frame of graphic content from.

As depicted, each of the memory locations 1116, 1118, 1120 have associated read flags 1138, 1140, and 1142. The read flags 1138, 1140, 1142 are used to determine if the associated memory location 1116, 1118, 1120 is currently being read by one of the display controls 1132, 1134. When a display control 1132 or 1134 begins reading a memory location 1116, 1118 or 1120, it sets the associated read flag 1138, 1140 or 1142, and when the display control 1132 or 1134 finishes reading from the memory location 1116, 1118 or 1120, it clears the read flag 1138, 1140 or 1142. The read flag 1138, 1140 or 1142 associated with each memory location 1116, 1118 or 1120 may comprise an individual flag for each display control 1132, 1134. If any one of the read flags 1138, 1140 or 1142 associated with a memory location 1116, 1118 or 1120 is set, then the memory location 1116, 1118 or 1120 is being read from, and as such should not be written to. It is contemplated that other means of determining if a memory location 1116, 1118 or 1120 is being read from may be used, such as counting semaphores.

The concurrent display system 1112, includes a pointer control component 1136 that updates the render pointer 1124. When the synchronization signal of the primary display occurs, the pointer control 1136 determines the memory location 1116, 1118 or 1120 to write the next frame of graphic content to. The pointer control 1136 determines a memory location 1116, 1118 or 1120 not being read by any display controls 1132, 1134 using the read flags 1138, 1140, 1142 and sets the render pointer 1124 to the free memory location 1116, 1118 or 1120. The pointer control 1136 also updates a display pointer 1126 to point to the previous memory location 1116, 1118 or 1120 pointed to by the render pointer 1124 prior to updating. The rendering engine 1130 can read the render pointer 1124 and write the next frame of graphic content to the corresponding memory location 1116, 1118 or 1120. The display controls 1132, 1134 can read the display pointer 1126 and read the current frame of graphic content from the corresponding memory location 1116, 1118 or 1120 and display it on the associated display 1108, 1110.

The pointer control 1136 determines the memory location 1116, 1118 or 1120 to render the next frame of graphic content to by determining memory locations 1116, 1118 or 1120 that are not currently being read from. Each display control 1132, 1134 can be reading graphic content from a separate memory location 1116, 1118 or 1120 concurrently, and as such at least one more memory locations than the number of displays is required to ensure that the graphic content can be rendered and displayed free from artifacts.

As described above, it is possible to display graphic content concurrently on multiple displays without having to have the synchronization signals of the displays aligned. Further, the concurrent display system only requires writing the graphic content to a single memory location at one time (e.g. concurrently). The above has described the use of pointers and/or read flags to track locations that can be rendered to and read from. Although various specific embodiments have been described for tracking the locations, it is contemplated that other means of tracking locations having no occurring read operation, as well as tracking a location having the current frame of graphic content may be used in addition to, or as an alternative for, the pointers and/or flags.

A device has been described that comprises a processing unit and a memory unit. It is also contemplated that the functionality described herein can be provided by a processing device that comprises the processing unit and the memory unit. The processing unit may be for example, one or more physical processors, one or more processing cores, co-processors, graphics processing units, or combinations thereof. The memory unit may be provided by read only memory, random access memory, cache memory, registers, non-volatile units or combinations thereof.

The system, apparatus and methods described above provide the ability to display graphic content written to a single memory location on multiple displays concurrently without artifacts occurring due to the rendering engine writing to the memory location being read by one or more display controls. The system and methods described herein have been described with reference to various examples. It will be appreciated that components from the various examples may be combined together, or components of the examples removed or modified. As described the system may be implemented in one or more hardware components including a processing unit and a memory unit that are configured to provide the functionality as described herein. Furthermore, a computer readable memory, such as for example electronic memory devices, magnetic memory devices and/or optical memory devices, may store computer readable instructions for configuring one or more hardware components to provide the functionality described herein.

What is claimed is:

1. A method for displaying graphic content to multiple displays concurrently comprising:
   determining a render location having no occurring read operation from a plurality of defined locations to render graphic content to;
   tracking the render location using a render pointer to track the render location;
   tracking a display location having a current frame of graphic content for display using a display pointer to track the display location, the display pointer updated from the render pointer;
   tracking one or more locations of the plurality of defined locations having no occurring read operations using a display-hold pointer to track one or more locations of the plurality of defined locations, the display-hold pointer updated from the display pointer;
   updating the display location from the render location responsive to a synchronization signal of a primary display of the multiple displays;
   rendering a frame of graphic content to the determined render location; and
   for each one of the multiple displays, responsive to a respective synchronization signal initiating a read operation of graphic content from a previously rendered-to location, from the plurality of defined locations, for display on the respective display;
   wherein the render pointer, the display pointer and the display-hold pointer are updated responsive to the synchronization signal of the primary display.

2. The method of claim 1, wherein determining the render location and rendering the frame of graphic content are done responsive to the synchronization signal of the primary display of the multiple displays.

3. The method of claim 2, wherein the synchronization signal of the primary display is periodic and determining the render location and rendering the frame of graphic content are repeated for each occurrence of the synchronization signal of the primary display.

4. The method of claim 1, wherein the synchronization signal of the primary display is periodic and wherein the render pointer, the display pointer and the display-hold pointer are updated for each occurrence of the synchronization signal of the primary display.

5. The method of claim 1, wherein the display-hold pointer comprises a first-in-first-out (FIFO) structure having a plurality of pointers, and updating the display-hold pointer comprises:
   adding a previous value of the display pointer to the FIFO structure of the display-hold pointer;
   propagating previous values through the plurality of pointers in the FIFO structure of the display-hold pointer; and
   wherein a last value of the FIFO structure of the display-hold pointer points to a location having no occurring read operation upon occurrence of the synchronization signal of the primary display.

6. The method of claim 1, further comprising:
   tracking initiated read operations from the plurality of defined locations; and
   tracking completed read operations from the plurality of defined locations.

7. The method of claim 6, further comprising:
   using read flags to track read operations from the plurality of defined locations; and
   using the read flags to determine the render location having no occurring read operation.

8. The method of claim 1, wherein a plurality of read operations may be initiated in a time interval during which a single frame of graphic content is being rendered.

9. The method of claim 1, wherein at least two displays of the multiple displays have respective synchronization signals that are misaligned.

10. A device for displaying graphic content to multiple displays concurrently, the device comprising:
    a plurality of defined memory locations;
    a processing unit for configuring the device to provide:
       determination of a render location having no occurring read operation from the plurality of defined memory locations to render graphic content to;
       rendering of a frame of graphic content to the determined render location;
       tracking of the render location using a render pointer to track the render location;
       tracking of a display location having a current frame of graphic content for display using a display pointer to track the display location, the display pointer updated from the render pointer;
       tracking of one or more locations of the plurality of defined memory locations having no occurring read operations using a display-hold pointer to track the one or more locations of the plurality of defined memory locations having no occurring read operations, the display-hold pointer updated from the display pointer, and
       for each one of the multiple displays, initiation of a read operation of graphic content from a previously rendered-to location, of the plurality of defined memory locations, for display responsive to a respective synchronization signal; and
       updating of the display location from the render location responsive to a synchronization signal of a primary display of the multiple displays;
       wherein the render pointer, the display pointer and the display-hold pointer are updated responsive to the synchronization signal of the primary display and determining the render location and rendering the frame of graphic content are done responsive to the synchronization signal of the primary display of the multiple displays;

at least one interface for communicating with the multiple displays.

11. The device of claim 10, wherein the synchronization signal of the primary display is periodic and determining the render location and rendering the frame of graphic content are repeated for each occurrence of the synchronization signal of the primary display.

12. The device of claim 10, wherein the synchronization signal of the primary display is periodic and wherein the render pointer, the display pointer and the display-hold pointer are updated for each occurrence of the synchronization signal of the primary display.

13. The device of claim 10, wherein the display-hold pointer comprises a first-in-first-out (FIFO) structure having a plurality of pointers, and updating the display-hold pointer comprises:

adding a previous value of the display pointer to the FIFO structure of the display-hold pointer;

propagating previous values through the plurality of pointers in the FIFO structure of the display-hold pointer; and wherein a last value of the FIFO structure of the display-hold pointer points to a location having no occurring read operation upon occurrence of the synchronization signal of the primary display.

14. The device of claim 10, wherein the processing unit is further for configuring the device to provide:

tracking of initiated read operations from the plurality of defined memory locations; and tracking of completed read operations from the plurality of defined memory locations.

15. The device of claim 14, wherein the processing unit is further for configuring the device to provide:

use of read flags to track read operations from the plurality of defined memory locations; and use of the read flags to determine the render location having no occurring read operation.

16. The device of claim 10, wherein a plurality of read operations may be initiated in a time interval during which a single frame of graphic content is being rendered.

17. The device of claim 10, wherein at least two displays of the multiple displays have respective synchronization signals that are misaligned.

18. A non-transitory computer readable memory containing instructions for displaying graphic content to multiple displays concurrently, the instructions which when executed by a processor performing:

determining a render location having no occurring read operation from a plurality of defined locations to render graphic content to;

tracking the render location using a render pointer to track the render location;

tracking a display location having a current frame of graphic content for display using a display pointer to track the display location, the display pointer updated from the render pointer;

tracking one or more locations of the plurality of defined locations having no occurring read operations using a display-hold pointer to track one or more locations of the plurality of defined locations, the display-hold pointer updated from the display pointer;

updating the display location from the render location responsive to a synchronization signal of a primary display of the multiple displays;

rendering a frame of graphic content to the determined render location; and for each one of the multiple displays, responsive to a respective synchronization signal initiating a read operation of graphic content from a previously rendered-to location, from the plurality of defined locations, for display on the respective display;

wherein the render pointer, the display pointer and the display-hold pointer are updated responsive to the synchronization signal of the primary display.

\* \* \* \* \*